(12) United States Patent
Lane

(10) Patent No.: US 11,243,367 B2
(45) Date of Patent: Feb. 8, 2022

(54) MULTIPLE CABLE SIZE FIBER OPTIC TRANSITION ASSEMBLIES

(71) Applicant: AFL Telecommunications LLC, Duncan, SC (US)

(72) Inventor: David James Lane, Chesnee, SC (US)

(73) Assignee: AFL TELECOMMUNICATIONS LLC, Duncan, SC (US)

( * ) Notice: Subject to any disclaimer, the term of this patent is extended or adjusted under 35 U.S.C. 154(b) by 0 days.

(21) Appl. No.: 16/054,364

(22) Filed: Aug. 3, 2018

(65) Prior Publication Data

US 2020/0041744 A1 Feb. 6, 2020

(51) Int. Cl.
G02B 6/44 (2006.01)
G02B 6/38 (2006.01)

(52) U.S. Cl.
CPC ......... *G02B 6/4471* (2013.01); *G02B 6/3861* (2013.01); *G02B 6/3878* (2013.01); *G02B 6/3887* (2013.01); *G02B 6/443* (2013.01)

(58) Field of Classification Search
None
See application file for complete search history.

(56) References Cited

U.S. PATENT DOCUMENTS

| | | | |
|---|---|---|---|
| 5,838,861 A | 11/1998 | Bunde | |
| 6,278,831 B1 | 8/2001 | Henderson et al. | |
| 6,389,214 B1 | 5/2002 | Smith et al. | |
| 6,738,555 B1 | 5/2004 | Cooke et al. | |
| 6,771,861 B2 | 8/2004 | Wagner et al. | |
| 7,035,510 B2 | 4/2006 | Zimmel et al. | |
| 7,277,614 B2 | 10/2007 | Cody et al. | |
| 7,664,363 B1 | 2/2010 | Mowery, Sr. | |
| 7,703,990 B1 | 4/2010 | de Jong et al. | |
| 8,155,490 B2 | 4/2012 | de Jong et al. | |
| 8,301,004 B2 | 10/2012 | Cooke et al. | |
| 8,380,029 B2 | 2/2013 | Cline et al. | |

(Continued)

FOREIGN PATENT DOCUMENTS

| | | |
|---|---|---|
| EP | 3111265 A1 | 1/2017 |
| FR | 2670303 A1 | 12/2013 |
| WO | WO2018/098324 A1 | 5/2018 |

OTHER PUBLICATIONS

AFL Telecommunications LLC; International Patent Application No. PCT/US2019/042207; International Search Report; dated Sep. 24, 2019; (2 pages).

*Primary Examiner* — Chris H Chu
(74) *Attorney, Agent, or Firm* — Dority & Manning, P.A.

(57) ABSTRACT

A fiber optic transition assembly includes a cable including an optical fiber and an outer jacket. The transition assembly further includes a furcation cable, the furcation cable surrounding an extended portion of the optical fiber, the furcation cable extending between a first end and a second end. The transition assembly further includes a transition member defining an interior, wherein a second end of the outer jacket and the first end of the furcation cable are disposed within the interior and the optical fiber extends from the outer jacket to the furcation cable within the interior. The transition assembly further includes an adapter at least partially disposed within the interior of the transition member, the adapter connected to the transition member and comprising an adapter body defining a cable aperture. The outer jacket extends through the cable aperture.

18 Claims, 7 Drawing Sheets

(56) References Cited

U.S. PATENT DOCUMENTS

| | | |
|---|---|---|
| 8,401,353 B2 | 3/2013 | Barker et al. |
| 8,571,367 B2 | 10/2013 | Van Der Meulen et al. |
| 8,705,930 B2 | 4/2014 | Lu et al. |
| 8,737,786 B1 | 5/2014 | Compton et al. |
| 8,917,968 B2 | 12/2014 | Cooke et al. |
| 8,948,557 B2 | 2/2015 | Islam |
| 8,958,673 B2 | 2/2015 | Cline et al. |
| 9,069,151 B2 | 6/2015 | Conner |
| 9,395,509 B2 | 7/2016 | Petersen et al. |
| 9,459,427 B2 | 10/2016 | Bustamante |
| 9,519,114 B2 | 12/2016 | Zimmel et al. |
| 9,548,601 B2 | 1/2017 | Strasser et al. |
| 9,548,603 B2 | 1/2017 | Loveless et al. |
| 9,575,277 B2 | 2/2017 | Bakatsias et al. |
| 9,798,100 B2 | 10/2017 | Harwath |
| 9,891,397 B2 | 2/2018 | Hurley et al. |
| 10,012,802 B2 | 7/2018 | Newbury et al. |
| 2008/0138026 A1 | 6/2008 | Yow |
| 2008/0175548 A1 | 7/2008 | Knecht et al. |
| 2014/0133822 A1 | 5/2014 | De Los Santos Campos |
| 2016/0365717 A1* | 12/2016 | Lazic .................. G02B 6/4416 |
| 2017/0102506 A1* | 4/2017 | Newbury ............ G02B 6/4471 |
| 2017/0227719 A1 | 8/2017 | Zimmel |
| 2017/0261699 A1* | 9/2017 | Compton ............. G02B 6/3825 |
| 2018/0061528 A1 | 3/2018 | Islam et al. |
| 2018/0129010 A1 | 5/2018 | Caldwell et al. |
| 2018/0149823 A1 | 5/2018 | Wang et al. |
| 2018/0321447 A1* | 11/2018 | Takano ................ G02B 6/3825 |
| 2019/0179083 A1* | 6/2019 | Wang .................. G02B 6/3803 |

\* cited by examiner

MULTIPLE CABLE SIZE FIBER OPTIC TRANSITION ASSEMBLIES

FIELD

The present disclosure relates generally to fiber optic communications networks, and more particularly fiber optic transition assemblies for use in fiber optic communications networks.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a premises (i.e. FTTP).

Various cable types and sizes are utilized throughout the network. For example, drop cables are utilized to connect the end user to the distribution cable. However, it can be difficult and time consuming to deploy certain types of cables for certain purposes due to the outdoor environment and challenges inherent thereto. For example, many such cables, including drop cables and other cable types and associated connectors, etc., must be environmentally sealed, rugged, and resistant to rodents, chemicals, etc.

One approach to deploying drop cables is to utilize a transition assembly, in which the two optical fibers from the drop cable are split into individual cables via a transition component. These individual cables are terminated with connectors that connect the optical fibers to the end user destinations. However, such known transition assemblies may have strain issues, resulting in significant losses which are evident in tests such as transmission tests with applied loadings. Further, the sealing of such known transition assemblies may be inadequate.

Additionally, in many cases, it may be desirable to deploy cable types other than drop cables utilizing a transition assembly, for example, in long span environments for which the drop cables would not be suited.

Accordingly, improved fiber optic transition assemblies are desired. In particular, fiber optic transition assemblies which include features which adapt the assemblies for specific use with one of a variety of cable types would be advantageous. Additionally, fiber optic transition assemblies which include improved strain relief features and/or sealing features would be advantageous.

BRIEF DESCRIPTION

Aspects and advantages of the invention will be set forth in part in the following description, or may be obvious from the description, or may be learned through practice of the invention.

In accordance with one embodiment, a fiber optic transition assembly is provided. The fiber optic transition assembly includes a cable including an optical fiber and an outer jacket, the outer jacket extending between a first end and a second end, the optical fiber extending from the second end of the outer jacket. The fiber optic transition assembly further includes a furcation cable, the furcation cable surrounding an extended portion of the optical fiber, the furcation cable extending between a first end and a second end. The fiber optic transition assembly further includes a transition member defining an interior, wherein the second end of the outer jacket and the first end of the furcation cable are disposed within the interior and the optical fiber extends from the outer jacket to the furcation cable within the interior. The fiber optic transition assembly further includes an adapter at least partially disposed within the interior of the transition member, the adapter connected to the transition member and including an adapter body defining a cable aperture, and wherein the outer jacket extends through the cable aperture.

In accordance with another embodiment, a fiber optic transition assembly is provided. The fiber optic transition assembly includes a cable including an optical fiber and an outer jacket, the outer jacket extending between a first end and a second end, the optical fiber extending from the second end of the outer jacket. The fiber optic transition assembly further includes a furcation cable, the furcation cable surrounding an extended portion of the optical fiber, the furcation cable extending between a first end and a second end. The fiber optic transition assembly further includes a biasing member, the biasing member surrounding a first end portion of the furcation cable. The fiber optic transition assembly further includes a transition member defining an interior, wherein the second end of the outer jacket and the first end of the furcation cable are disposed within the interior, the biasing member is at least partially disposed in the interior, and the optical fiber extends from the outer jacket to the furcation cable within the interior. The fiber optic transition assembly further includes an adapter at least partially disposed within the interior of the transition member, the adapter connected to the transition member and including an adapter body defining a cable aperture, and wherein the outer jacket extends through the cable aperture. The fiber optic transition assembly further includes a connector, the connector including a body extending between a first end and a second end, wherein the second end of the furcation cable is disposed within the connector and the optical fiber extends from the second end of the furcation cable within of the connector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
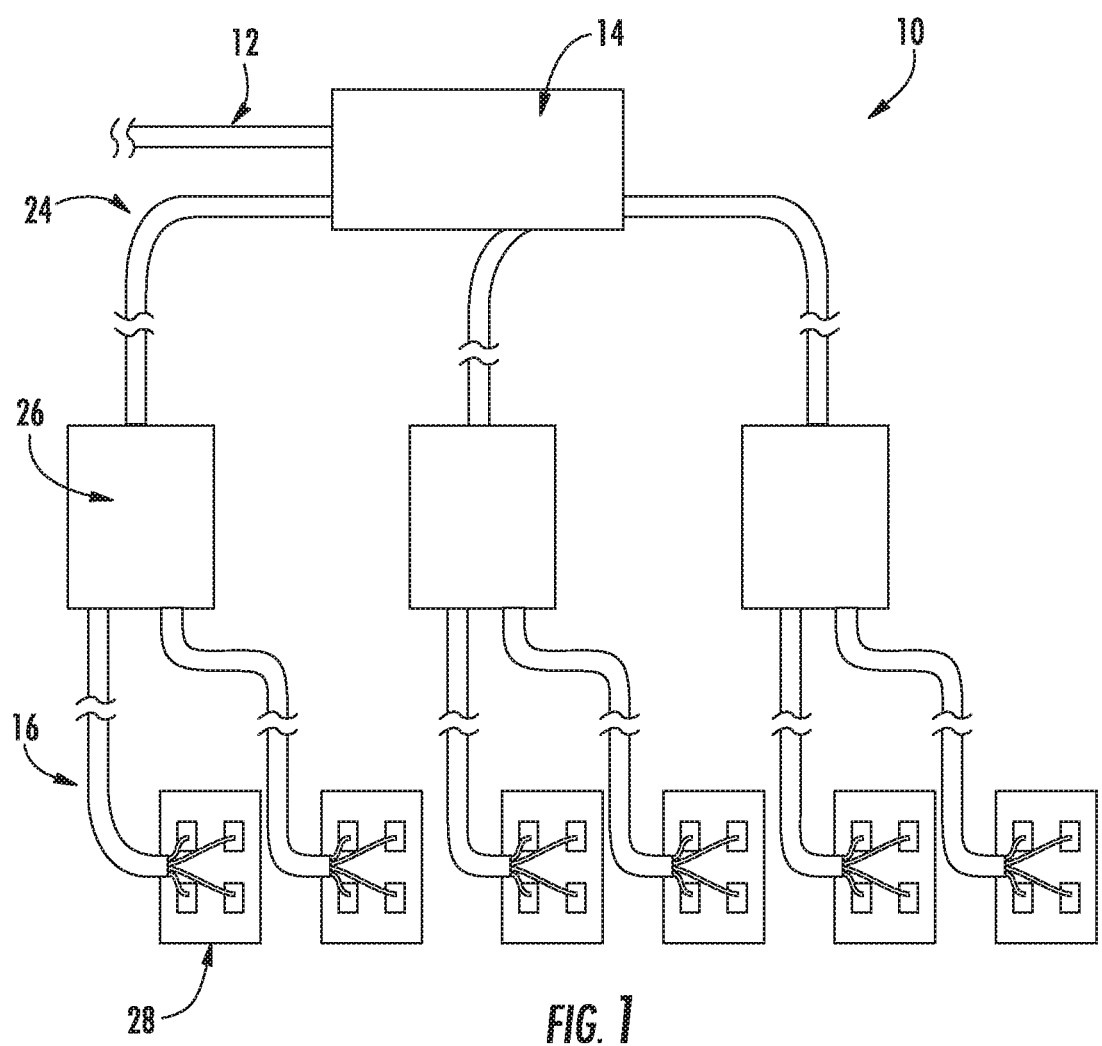
FIG. 1 is a schematic illustration of a known fiber optic communications network.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a portion of a known fiber optic communications network 10 which includes a fiber optic distribution cable 12 is shown. One or more mid-span access locations are provided along the length of the distribution cable 12. The mid-span access location may be enclosed and protected from exposure to the environment by a conventional closure 14. The fiber optic communications network 10 may include a fiber optic distribution cable 12 having a plurality of mid-span access locations at branch points spaced along the length of the distribution cable, each providing access to at least one, and preferably, a plurality of optical fibers of the fiber optic network. Thus, in the embodiments shown, the distribution cable 12 may provide multiple locations for joining stub cables 24 of multi-port optical connection terminals 26 to the distribution cable 12 at each mid-span access location.

In the fiber optic network 10 as illustrated, pre-terminated optical fibers of the distribution cable 12 provided at the mid-span access location are routed out of the distribution cable and spliced to respective optical fibers of a stub cable 24 extending from a multi-port optical connection terminal 26. The optical fibers of the stub cable 24 may enter the closure 14 through a suitable cable port provided through an exterior wall, for example an end wall, of the closure 14. The stub cable 24 includes at least one, and preferably a plurality of optical fibers disposed within a protective cable sheath.

The stub cable 24 may, for example, be any known fiber optic cable which includes at least one optical fiber and having a fiber count equal to or greater than that of a cable 16, which may for example be a drop cable, to be connected to the multi-port optical connection terminal 26 and equal to or less than that of the distribution cable 12.

The stub cable 24 may extend from the closure 14 into a terminal 26. The optical fibers of the stub cable 24 within the terminal 26 may be connectorized. One or more connectorized cables 16 may be interconnected with the connectorized optical fibers of the stub cable 24, i.e. in terminal 26. The cables 16 may include at least one single mode or multimode optical fiber of any type optically connected to a single fiber or multi-fiber optical connector in a conventional manner. The other ends of the cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, one or more stub cables 24 extends from the closure 14 to a terminal 26 positioned at a distance from the mid-span access location, such as a telephone pole, hand-hole, vault or pedestal (not shown) in the fiber optic network 10. Each cable 16 extends from a terminal 26 to an outside plant connection terminal 28 located at a delivery point such as a subscriber premises.

It should be understood that the present disclosure is not limited to the above-described embodiment of a fiber optic network 10, and rather that any suitable fiber optic network 10 is within the scope and spirit of the present disclosure.

Figure 2:
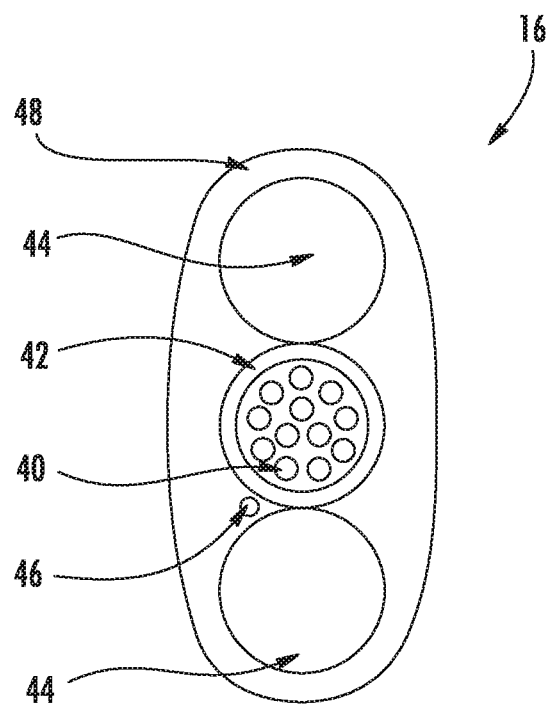
FIG. 2 is a cross-sectional view of a cable in accordance with embodiments of the present disclosure.
Figure 3:
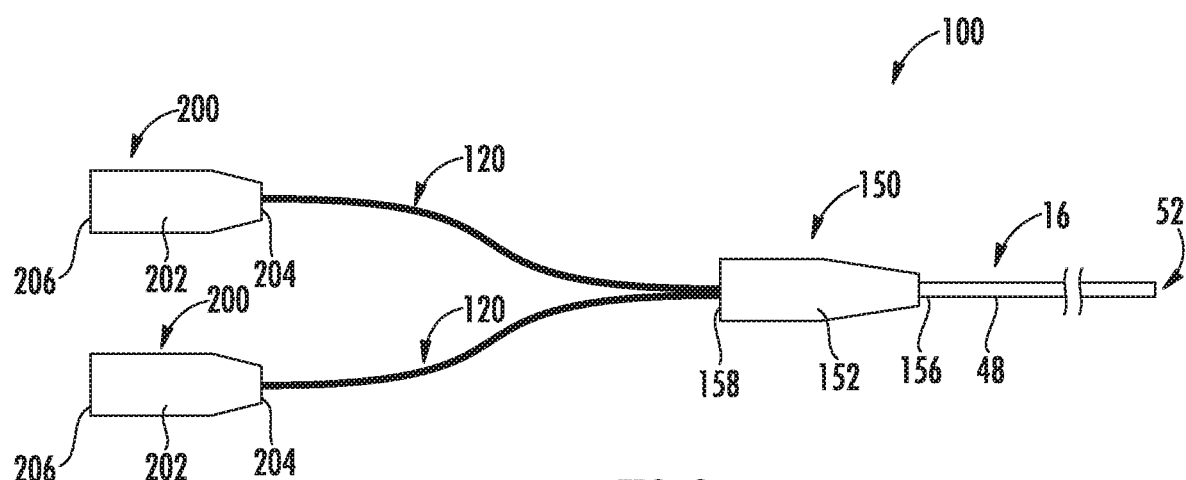
FIG. 3 is a schematic illustration of a transition assembly in accordance with embodiments of the present disclosure.
Figure 4:
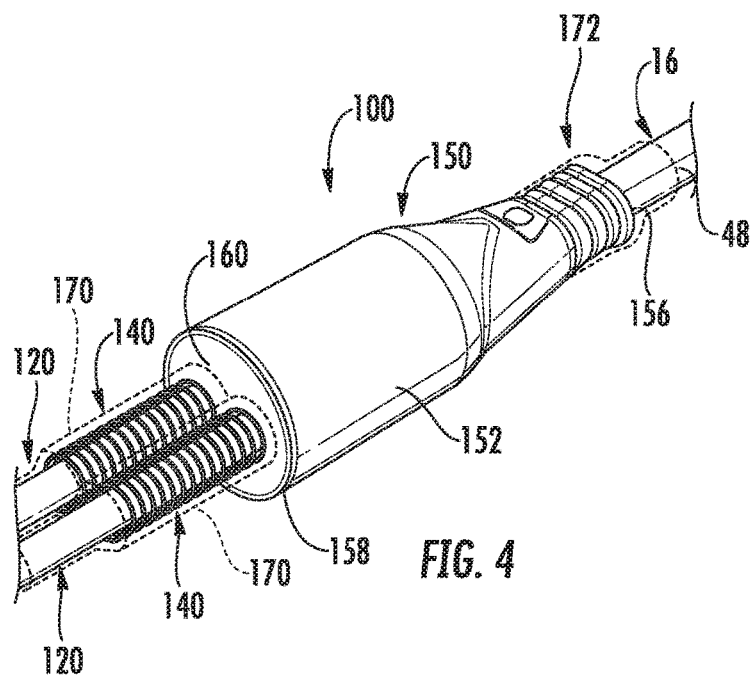
FIG. 4 is a perspective view of a portion of a transition assembly, including a transition member, in accordance with embodiments of the present disclosure.
Figure 5:
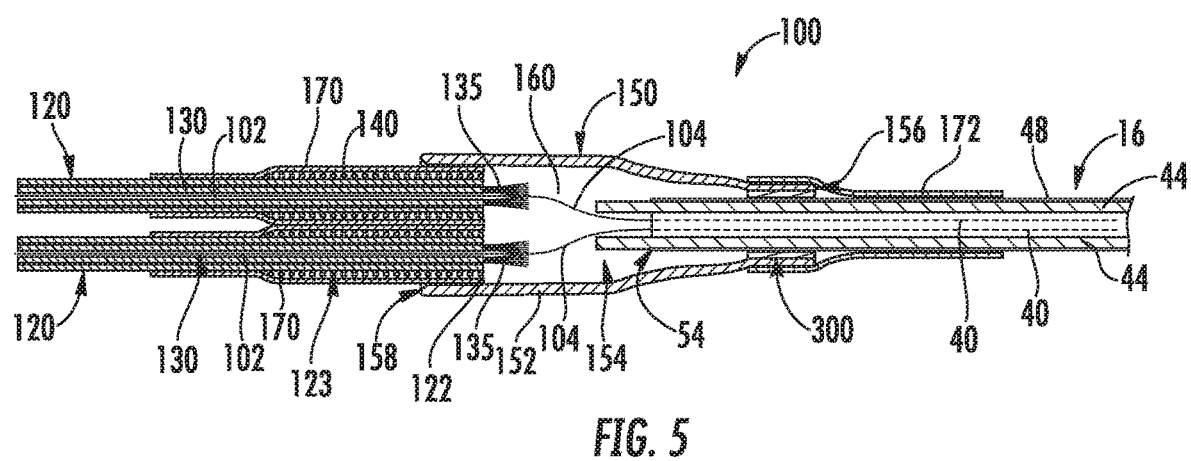
FIG. 5 is a cross-sectional view of a portion of a transition assembly, including a transition member, in accordance with embodiments of the present disclosure.
Figure 6:
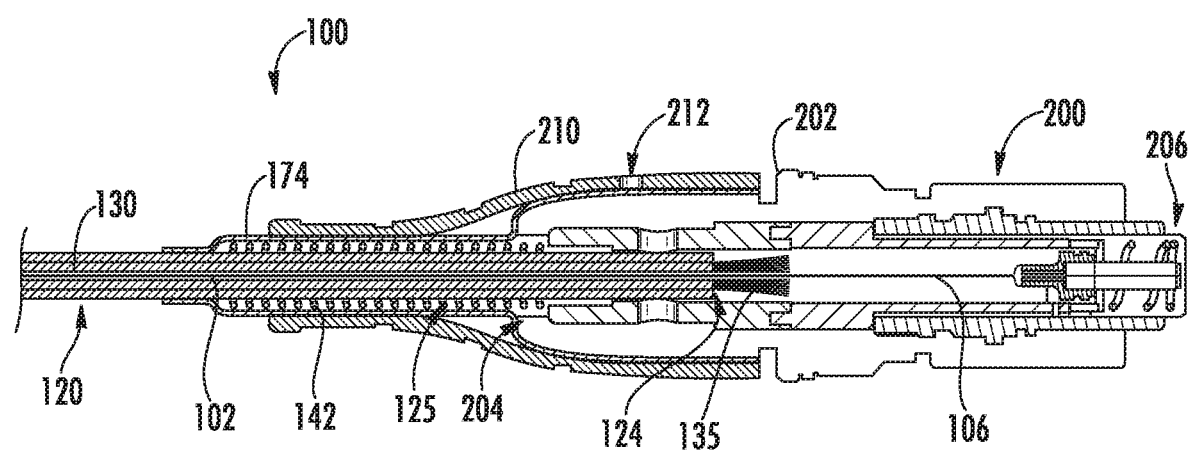
FIG. 6 is a cross-sectional view of a portion of a transition assembly, including a connector, in accordance with embodiments of the present disclosure.

Referring now to FIG. 2, a cable 16 in accordance with embodiments of the present disclosure is illustrated. As shown, cable 16 may include one or more, such as in some cases a plurality, of optical fibers 40 disposed within a buffer tube 42. In some embodiments, a gel may be provided in the buffer tube 42 surrounding the optical fibers 40. Cable 16 may further include strength rods 44, which in exemplary embodiments may be water blocking dielectric strength rods. A water blocking thread 46 may additionally be provided in the cable 16. An outer jacket 48 may surround the strength rods 44, buffer tube 42 and water blocking thread 46. The jacket 48 may, for example, be formed from a UV resistant material. The jacket 48 may include and form an outermost layer and exterior surface of the cable 16. In exemplary embodiments as shown, the cable 16 generally, and thus the jacket 48 thereof, may have an oval-shaped cross-sectional profile. Accordingly, the cross-sectional profile may have a major diameter and a minor diameter which are not equal (with the major diameter being greater than the minor diameter), as opposed to a circular cross-sectional profile which has a constant radius. Alternatively, however, cable 16 may have a circular cross-sectional profile. The cable of the embodiment illustrated in conventionally referred to as a drop cable. However, it should be understood that the present disclosure is not limited to the above-described drop cable embodiment, and rather that any suitable cable is within the scope and spirit of the present disclosure.

Referring now to FIGS. 3 through 11, embodiments of a fiber optic transition assembly 100 and components thereof are illustrated. The transition assembly 100 may include a cable 16, which may include one or more, such as in some embodiments a plurality of, optical fibers 40 and an outer jacket 48. Further, in exemplary embodiments, cable 16 may include one or more strength rods 44 and/or other suitable components as discussed above. Outer jacket 48 may extend between a first end 52 and a second end 54, and each optical fiber 40 may extend from the second end 54 of the outer jacket 48 as shown. Further, in some embodiments, the strength rods 44 and/or other components may also extend from the second end 54.

Assembly 100 may further include one or more, such as in some embodiments a plurality of, furcation cables 120. Each furcation cable 120 may extend between a first end 122 and a second end 124, as illustrated. Further, as discussed, an extended portion 102 of an optical fiber 40 may extend into each furcation cable 120, such as through the first end 122 of a furcation cable 120. Accordingly, each furcation cable 120 may include an optical fiber 40 (from cable 16) therein and may thus surround such extended portion 102 of such optical fiber 40. While in exemplary embodiments only a single optical fiber 40 extends into each furcation cable 120, in alternative embodiments a plurality of optical fibers 40 may extend into each furcation cable 120.

One or more furcation cables 120 may be utilized in accordance with the present disclosure. In exemplary embodiments, more than one furcation cable 120, such as two, three, four, or more, may be utilized. Assemblies 100 in accordance with the present disclosure advantageously facilitate the use of more than one furcation cable 120 if desired or required.

In some embodiments, an inner furcation tube 130 may additionally surround the extended portion 102 of each optical fiber 40. The inner furcation tube 130 may serve to protect the optical fiber 40 as it exits the outer jacket 48 at the second end 54 thereof. Such inner furcation tube 130 may thus be disposed between the optical fiber 40 and furcation cable 120. Additionally, in some embodiments, strength members 135, such as fibers (in exemplary embodiments aramid fibers) are disposed within each furcation cable 120.

Assembly 100 may further include one or more, such as in some embodiments a plurality of, first biasing members 140. Such biasing members 140 are, in exemplary embodiments, springs, such as coil springs as shown. Such biasing member 140 may surround a first end portion 123 of the furcation cable 120. Such first end portion 123 may be a portion that is relatively proximate to the first end 122 and distal from the second end 124 along the length of the furcation cable 120. In exemplary embodiments, the first end portion 123 may include the first end 122. Biasing members 140 may advantageously provide strain relief to the furcation cables 120 during use as the cables 120 are moved and bent into various positions.

Assembly 100 further includes a transition member 150. Transition member 150 provides a transition between the cable 16 and the furcation cables 120, and more specifically provides a location for the optical fibers 40 to extend from the cable 16 into the furcation cables 120, such that the optical fibers 40 are advantageously protected in this transition.

Transition member 150 includes a body 152 which defines an interior 154. The transition member 150, such as the body 152 thereof, extends along a longitudinal axis between a first end 156 and a second end 158. In exemplary embodiments as shown, the second end 158 may have a cross-sectional area that is greater than a cross-sectional area of the first end 156. In exemplary embodiments, transition member 150 may be formed from a plastic, such as a blend which includes nylon and/or poly(p-phenylene oxide). In exemplary embodiments, such material may include reinforcing fibers, such as glass fibers. Alternatively, other suitable materials may be utilized.

The second end 54 of the outer jacket 48 may be disposed within the interior 154. For example, in exemplary embodiments, the cable 16 (and outer jacket 48 thereof) enters the transition member 150 through the first end 156 thereof. Further, the first ends 122 of each furcation cable 120 may be disposed within the interior 154. For example, in exemplary embodiments, each furcation cable 120 enters the transition member 150 through the second end 158 thereof. Additionally, each biasing member 140 may be at least partially disposed within the interior 154. For example, in exemplary embodiments, each biasing member 140 enters the transition member 150 through the second end 158 thereof. Accordingly, each biasing member 140 extends from the transition member 150, such as from the second end 158 thereof. Further, the first end portion 123 may thus extend from the transition member 150.

Optical fibers 40 may extend from the outer jacket 48, such as the second end 54 thereof, to and into furcation cables 120, such as the first ends 122 thereof, within the interior 154. In some embodiments, a portion of such optical fibers 40 (i.e. an exposed portion 104 of the extended portion 102) may be exposed within the interior 154. Such exposed portion 104 is not surrounded by either outer jacket 48 or a furcation cable 120, although such exposed portion 104 may be surrounded by an inner furcation tube 130. Alternatively, extended portions 102 may extend directly from outer jacket 48 into furcation cables 120, with no exposed portion 104 being evident.

Further, in some embodiments, strength rods 44 may extend from the outer jacket 48, such as the second end 54 thereof, into the interior 154. Such strength rods 44 may, for example, terminate in the interior 154. Further, such strength rods 44 do not enter the furcation cables 120.

Assembly 100 further includes an adapter 300. The adapter 300 may be at least partially, and in some embodiments fully, disposed within the interior 154 of the transition member 150. Adapter 300 may advantageously allow for one of a variety of different cables 16 having different sizes and cross-sectional shapes to be utilized with the transition member 150 and assembly 100 generally. In some embodiments, such different cables 16 may have oval and/or circular cross-sectional shapes, and the maximum diameter of such cables 16 may for example, be in the range of less than or equal to 12 millimeters, such as in the range from 6 millimeters to 12 millimeters, such as in the range from 8 millimeters to 10 millimeters. Accordingly, the transition member 150 advantageously need not have a custom size and shape for a specific cable 16. Rather, an adapter 300 that corresponds to a desired cable 16 is selected and utilized with the transition member 150.

Adapter 300 may include a body 302 which extends along a longitudinal axis between a first end 304 and a second end 306. When assembled with the transition member 150, the adapter 300 may be inserted into the first end 156, and the first end 304 may be proximate the first end 156 while the second end 306 is distal from the first end 156 relative to each other. The second end 306 may be disposed in the interior 154, and the first end 304 may be disposed in the interior 154 or exterior to the transition member 150.

Adapter 300, such as the body 302 thereof, may define a cable aperture 310. Cable aperture 310 may extend along the longitudinal axis between and including the first and second ends 304, 306. As discussed, the cable 16 (and outer jacket 48 thereof) enters the transition member 150 through the first end 156 thereof. Accordingly, the cable 16 (and outer jacket 48 thereof) extends through the cable aperture 310 when entering the transition member 150.

Figure 7:
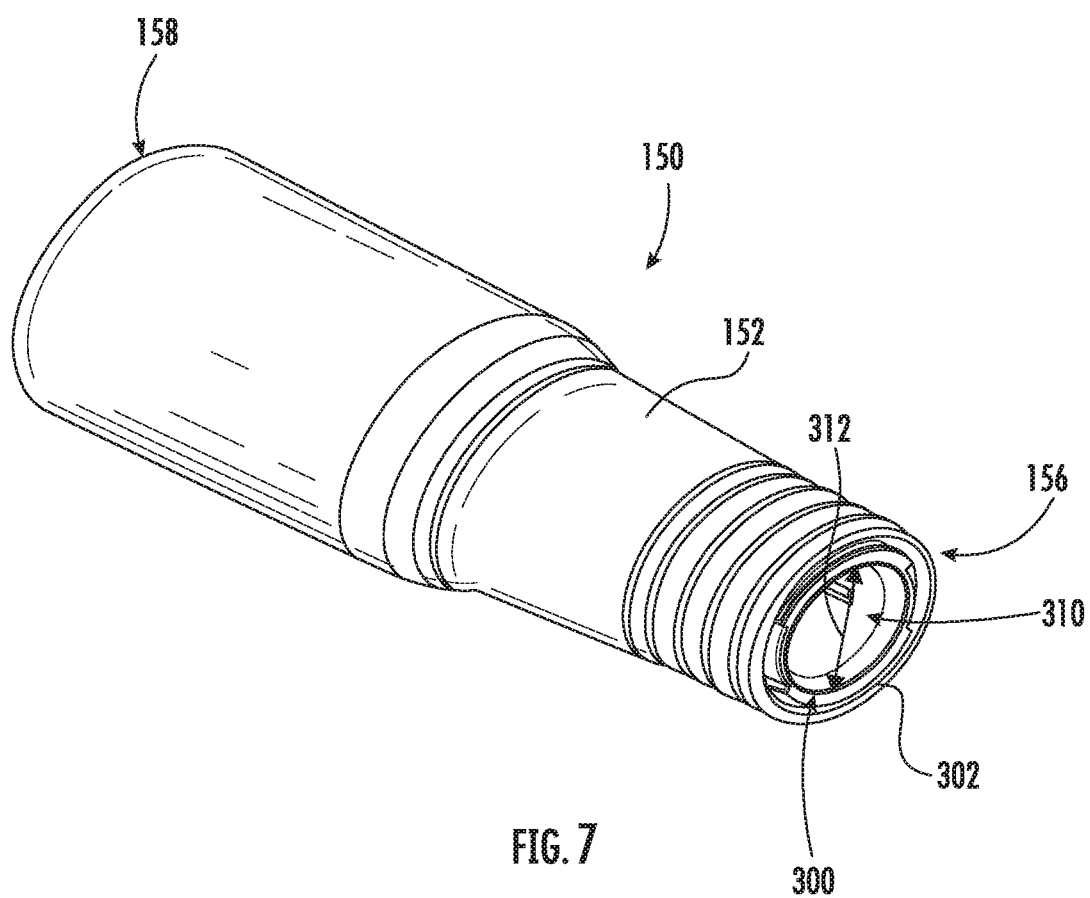
FIG. 7 is a perspective view of components of a transition assembly, including a transition member and an adapter, in accordance with embodiments of the present disclosure.
Figure 8:
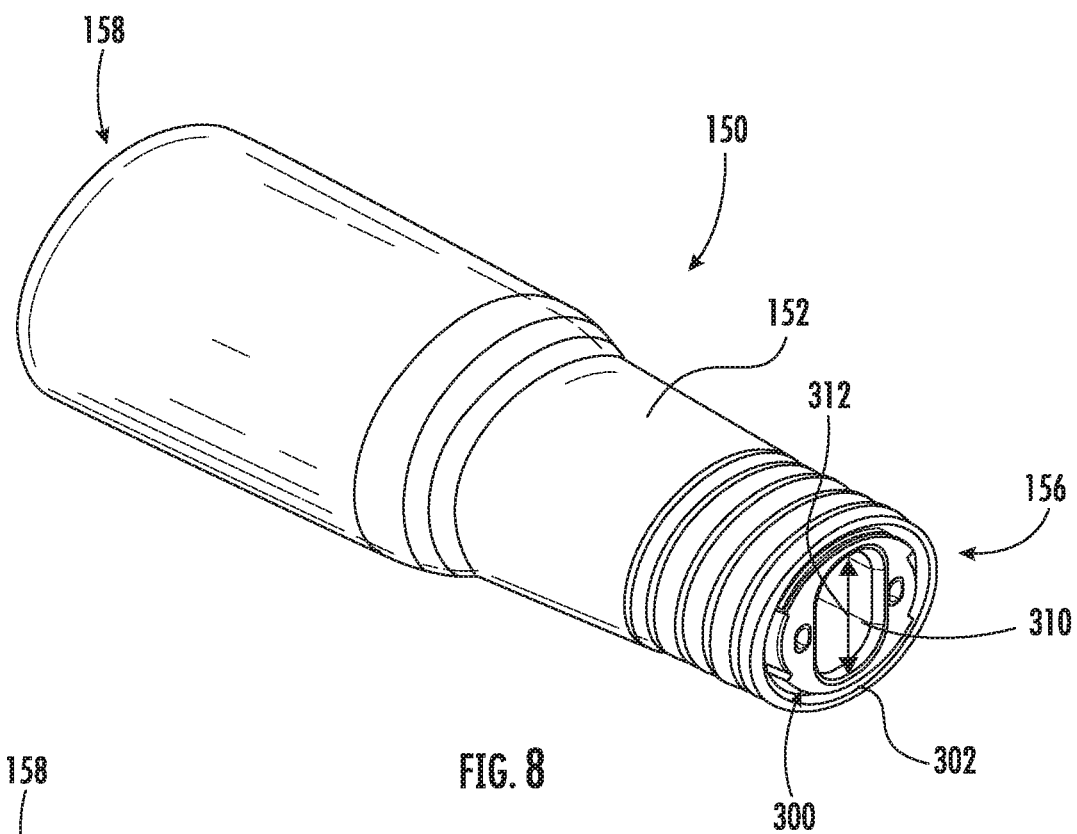
FIG. 8 is a perspective view of components of a transition assembly, including a transition member and an adapter, in accordance with other embodiments of the present disclosure.
Figure 9:
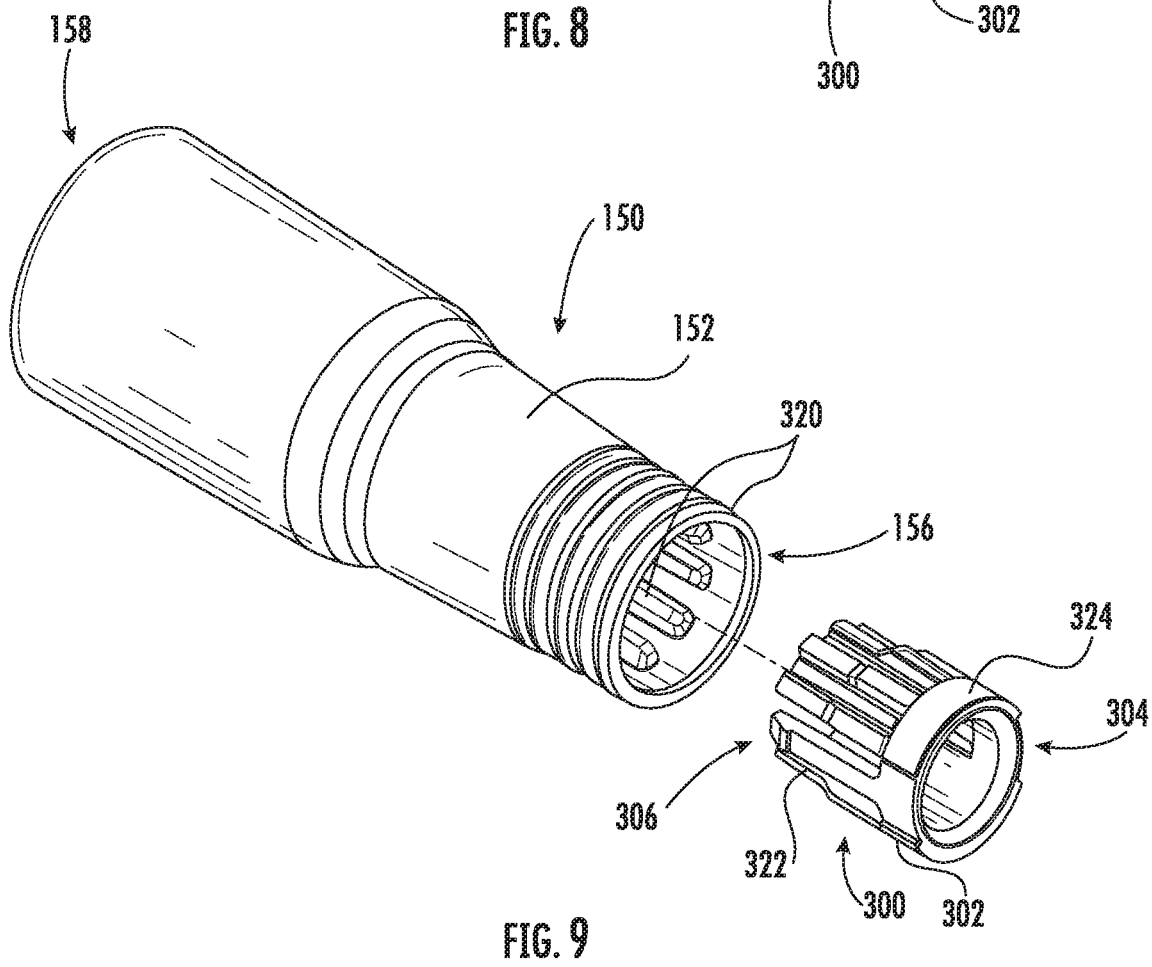
FIG. 9 is a perspective disassembled view of components of a transition assembly, including a transition member and an adapter, in accordance with embodiments of the present disclosure.

The cable aperture 310 may have a size and shape that corresponds to the size and shape of the cable 16 being utilized with transition assembly 100. For example, the cable aperture 310 may have an oval cross-sectional shape (as shown in FIG. 8) or a circular cross-sectional shape (as shown in FIGS. 7 and 9). Further, the cable aperture 310 may have a maximum cross-sectional diameter 312 that corresponds to that of the associated cable 16 to allow the cable 16 to enter the cable aperture 310. For example, diameter 312 may be between 6 millimeters and 12 millimeters, such as between 8 millimeters and 10 millimeters.

Figure 10:
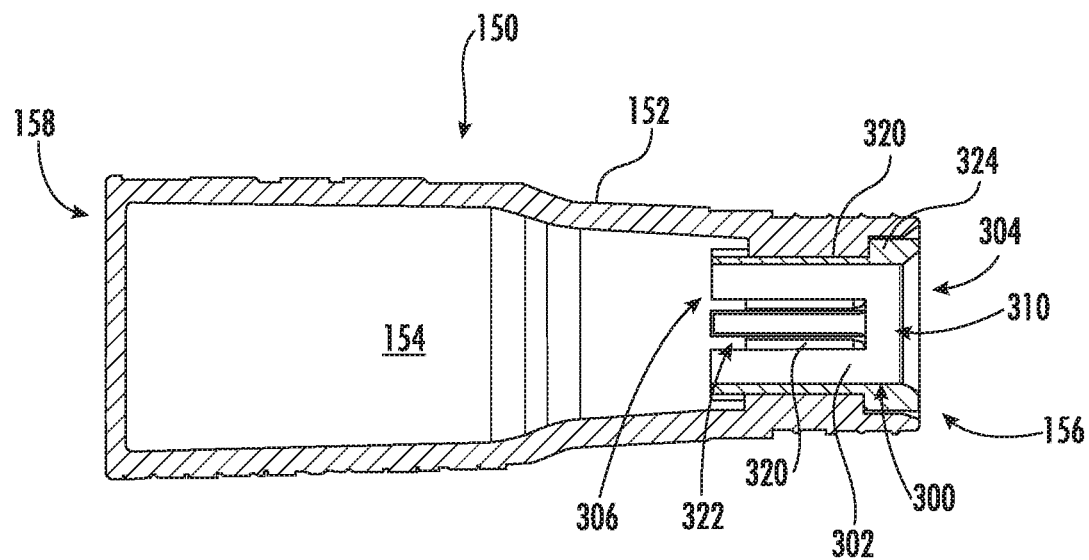
FIG. 10 is a cross-sectional view of components of a transition assembly, including a transition member and an adapter, in accordance with embodiments of the present disclosure.

Adapter 300 may be connected to the transition member 150. For example, in some embodiments as illustrated in FIGS. 9 and 10, the transition member 150 may include a plurality of interior ribs 320. The ribs 320 may, for example, be disposed proximate the first end 156. The ribs 320 may, for example, be longitudinally extending ribs which are disposed in an annular array within the interior 154, or may have other suitable orientations and arrangements. Adapter 300 may define a plurality of slots 322. The slots 322 may correspond to the ribs 320, and may thus for example, be longitudinally extending slots which are disposed in an annular array, or may have other suitable orientations and arrangements. The slots 322 may be defined in the body 302, and may for example extend from the second end 306 towards the first end 304. When assembled, each of the plurality of ribs 320 is disposed in one of the plurality of slots 322, as shown for example in FIG. 10.

Additionally, in some embodiments, the adapter 300 may include one or more tabs 324 which, when assembled, abut against the ribs 320. Tabs 324 may be disposed at or proximate (relative to the second end 306) the first end 304 of the adapter 300, and may protrude outwardly from the body 302. Additionally or alternatively, tabs 324 may be disposed at or proximate (relative to the first end 304) the second end 306 of the adapter 300, and may protrude outwardly from the body 302.

Figure 11:
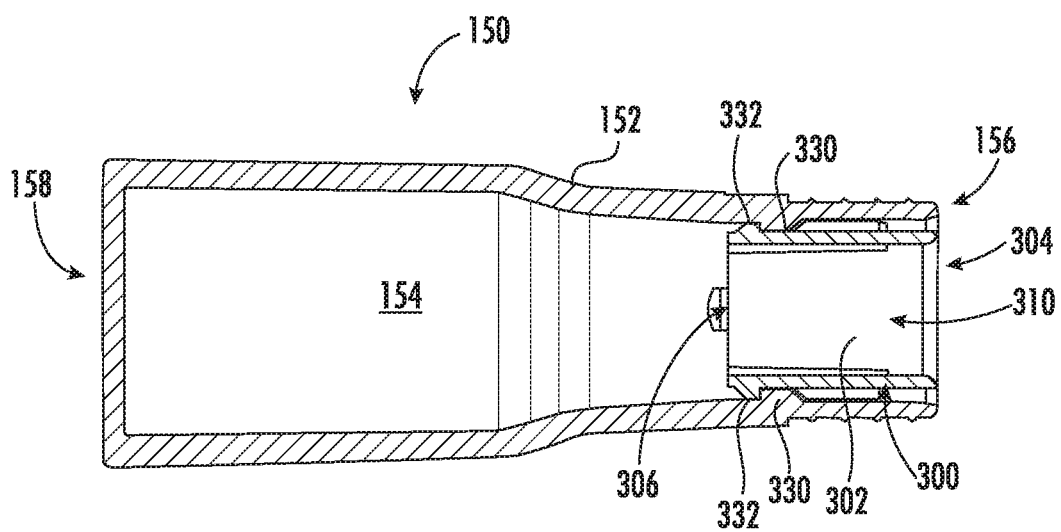
FIG. 11 is a cross-sectional view of components of a transition assembly, including a transition member and an adapter, in accordance with other embodiments of the present disclosure.

Alternatively, in some embodiments as shown in FIG. 11, the transition member 150 may include one or more interior latches 330. The latches 330 may, for example, be disposed proximate the first end 156. The latches 320 may, for example, each extend generally annularly within the interior 154, or may have other suitable orientations. Adapter 300 may include one or more tabs 332 which, when assembled, abut against the latches 330. Tabs 332 may be disposed at or proximate (relative to the first end 304) the second end 306 of the adapter 300, and may protrude outwardly from the body 302.

In some embodiments, the tabs 332 may be tapered. Such tapering 332 may allow the tabs 332 to pass over the latches 330 when the adapter 300 is inserted into the transition member 150.

Additionally or alternatively, other suitable features may be utilized to connect the adapter 300 to the transition member 150. For example, the adapter 300 and transition member 150 may include mating threads, or other suitable latching configurations may be utilized.

In exemplary embodiments, an adhesive 160 may be disposed within the interior 154. Adhesive 154 may surround the other components within the interior 154, such as the cable 120, outer jacket 48, optical fibers, 40, inner furcation tubes 130, adapter 300, etc., and may advantageously provide a seal to protect such components from the exterior environment. In some exemplary embodiments, the adhesive 160 may be a suitable epoxy or suitable urethane material. In some embodiments, a material with a relatively higher viscosity may be utilized. For example, a material having a viscosity of between 50,000 and 60,000 cP at 25° C., which may in some embodiments be an epoxy, may be utilized. In other embodiments, a material with a relatively lower viscosity may be utilized. Lower viscosity materials may be particularly advantageous, as they provide better flow, thus resulting in improved sealing and moisture ingress prevention. For example, a material having a viscosity of between 400 and 900 cP at 25° C., such as between 500 and 800 cP at 25° C., such as between 600 and 700 cP at 25° C., such as 650 cP at 25° C., may be utilized. In exemplary embodiments, the material may be a urethane.

Assembly 100 may further include one or more, such as in some embodiments a plurality, of first heat shrink tubes 170. Each first heat shrink tube 170 may surround and protect various other components of the assembly 100. For example, a first heat shrink tube 170 may surround the first end portion 123 of each furcation cable 120. Further, such first heat shrink tube 170 may surround the biasing member 140 that surrounds such first end portion 123. The first heat shrink tube 170 may fully or partially surround the biasing member 140 (such as fully surround the portion of the biasing member 140 outside the transition member 150), and may contact the biasing member 140 as well as a portion of the first end portion 123 or furcation cable 120 generally. Further, in exemplary embodiments, each such heat shrink tube 170 may be partially disposed within interior 154 and thus extend from interior 154, such as from the second end 158 of the transition member 150. Such heat shrink tubes 170 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include a second heat shrink tube 172. The second heat shrink tube 172 may surround and protect various other components of the assembly 100. For example, the second heat shrink tube 172 may surround a portion of the cable 16 (such as the outer jacket 48 thereof), that extends from the transition member 150, such as the first end 156 thereof. The second heat shrink tube 172 may further surround a portion of the transition member 150, such as including the first end 156. Such heat shrink tube 172 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include one or more, such as in some embodiments a plurality, of connectors 200. Any suitable connectors may be utilized. Each optical fiber 40 may terminate in a connector 200, such as in the body 202 thereof, as shown. In general, a connector 200 may include a body 202 which extends between a first end 204 and a second end 206.

Each connector 200 may be connected to a furcation cable 120, such that the second end 124 of the furcation cable 120 is disposed within such connector 200. For example, the furcation cable 120 may enter the connector 200 through the first end 204 thereof. Further, the optical fiber(s) 40 within such furcation cable 120 may extend from the second end 124 thereof within such connector 200, and terminate within such connector 200. Accordingly, an end portion 106 of each optical fiber 40 may be disposed within a connector 200.

In exemplary embodiments, assembly 100 further includes one or more, such as in some embodiments a plurality, of second biasing members 142. Such second biasing members 142 are, in exemplary embodiments, springs, such as coil springs as shown. Such biasing member 140 may surround a second end portion 125 of the furcation cable 120. Such second end portion 125 may be a portion that is relatively proximate to the second end 124 and distal from the first end 122 along the length of the furcation cable 120. In exemplary embodiments, the second end portion 125 may include the second end 124. Biasing members 142 may advantageously provide strain relief to the furcation cables 120 during use as the cables 120 are moved and bent into various positions.

In exemplary embodiments, as shown, a second biasing member 142 may be at least partially disposed within a connector 200. For example, a second biasing member 142 may extend from a connector 200, such as from the first end 204 thereof. Alternatively, a second biasing member 142 may be entirely external to the associated connector 200.

Assembly 100 may further include one or more, such as in some embodiments a plurality, of third heat shrink tubes 174. Each third heat shrink tube 174 may surround and protect various other components of the assembly 100. For example, a third heat shrink tube 174 may surround the second end portion 125 of a furcation cable 120. Further, such third heat shrink tube 174 may surround the biasing member 142 that surrounds such second end portion 125. The third heat shrink tube 174 may fully or partially surround the biasing member 142 (such as fully surround the portion of the biasing member 142 outside the connector 200), and may contact the biasing member 142 as well as a portion of the second end portion 124 or furcation cable 120 generally. Further, in exemplary embodiments, each such heat shrink tube 174 may surround at least a portion of the connector 200, such as including the first end 204. Such heat shrink tubes 174 may be formed from any suitable heat shrink material, such as in exemplary embodiments a polyolefin. For example, a suitable heat shrink material may, in some embodiments, have an operating temperature of between −55 degrees and 110 degrees Celsius, a minimum shrink temperature of 80 degrees Celsius, and a minimum full recovery temperature of 110 degrees Celsius. A suitable heat shrink material may, in some embodiments, have a shrink ratio of between 2:1 and 5:1, such as between 3.5:1 and 4.5:1, such as between and including 3:1 and 4:1.

Assembly 100 may further include one or more, such as in some embodiments a plurality, of boots 210. Each boot 210 may surround and protect a portion of a connector 200 and other various components associate with such connector. For example, the first end 204 of a connector 200 may be disposed within a boot 210, as shown. Further, one or more of an associated third heat shrink tube 174, an associated second biasing member 142, and/or an associated furcation cable 120 (such as the second end portion 125 thereof) may be at least partially disposed within such boot 210.

In some embodiments, one or more slots 212 may be defined in the boot 210. Each slot may extend entirely through a thickness of the boot 210, such that the heat shrink tube 174 is visible through the slot 212. Further, in some embodiments, the heat shrink tubes 174 may be color-coded, such that each heat shrink tube 174 has a different color than other heat shrink tubes 174 in the assembly 100. Such colors may correspond to different optical fibers 40 in the assembly 100, and facilitate easy identification of the optical fiber(s) 40 in each furcation cable 120 and connector 200 by a user.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic transition assembly, comprising:
a cable comprising an optical fiber and an outer jacket, the outer jacket extending between a first end and a second end, the optical fiber extending from the second end of the outer jacket;
a furcation cable, the furcation cable surrounding an extended portion of the optical fiber, the furcation cable extending between a first end and a second end;
a transition member defining an interior, wherein the second end of the outer jacket and the first end of the furcation cable are disposed within the interior and the optical fiber extends from the outer jacket to the furcation cable within the interior, and wherein the transition member comprises a plurality of longitudinally extending interior ribs in an annular array; and
an adapter fully disposed within the interior of the transition member, the adapter connected to the transition member and comprising an adapter body defining a cable aperture, wherein the outer jacket extends through the cable aperture, wherein the adapter defines a plurality of slots, and wherein the plurality of ribs of the transition member is disposed in the plurality of slots.

2. The fiber optic transition assembly of claim 1, wherein the cable aperture has one of an oval or circular cross-sectional shape.

3. The fiber optic transition assembly of claim 1, wherein the cable aperture has a maximum cross-sectional diameter of less than or equal to 12 millimeters.

4. The fiber optic transition assembly of claim 1, wherein the adapter comprises a tab, and wherein the tab abuts against the plurality of ribs.

5. The fiber optic transition assembly of claim 1, wherein the transition member comprises an interior latch and the adapter comprises a tab, and wherein the tab abuts against the plurality of ribs.

6. The fiber optic transition assembly of claim 5, wherein the tab is tapered.

7. The fiber optic transition assembly of claim 1, further comprising a biasing member, the biasing member surrounding a first end portion of the furcation cable.

8. The fiber optic transition assembly of claim 7, wherein the biasing member is a coil spring.

9. The fiber optic transition assembly of claim 7, wherein the biasing member extends from the transition member.

10. The fiber optic transition assembly of claim 1, wherein the transition member extends between a first end and a second end, wherein the cable enters the first end of the transition member, and wherein the furcation cable enters the second end of the transition member.

11. The fiber optic transition assembly of claim 1, further comprising an adhesive disposed within the interior.

12. The fiber optic transition assembly of claim 1, further comprising:
a connector, the connector comprising a body extending between a first end and a second end,
wherein the second end of the furcation cable is disposed within the connector and the optical fiber extends from the second end of the furcation cable within the connector.

13. The fiber optic transition assembly of claim 12, wherein the biasing member is a first biasing member, and further comprising a second biasing member, the second biasing member surrounding a second end portion of the furcation cable.

14. A fiber optic transition assembly, comprising:
a cable comprising an optical fiber and an outer jacket, the outer jacket extending between a first end and a second end, the optical fiber extending from the second end of the outer jacket;
a furcation cable, the furcation cable surrounding an extended portion of the optical fiber, the furcation cable extending between a first end and a second end;
a biasing member, the biasing member surrounding a first end portion of the furcation cable;
a transition member defining an interior, wherein the second end of the outer jacket and the first end of the furcation cable are disposed within the interior and the optical fiber extends from the outer jacket to the furcation cable within the interior, and wherein the transition member comprises a plurality of longitudinally extending interior ribs in an annular array; and
an adapter fully disposed within the interior of the transition member, the adapter connected to the transition member and comprising an adapter body defining a cable aperture, wherein the outer jacket extends through the cable aperture, wherein the adapter defines a plurality of slots, and wherein the plurality of ribs of the transition member is disposed in the plurality of slots; and
a connector, the connector comprising a body extending between a first end and a second end, wherein the second end of the furcation cable is disposed within the connector and the optical fiber extends from the second end of the furcation cable within of the connector.

15. The fiber optic transition assembly of claim 14, wherein the cable aperture has one of an oval or circular cross-sectional shape.

16. The fiber optic transition assembly of claim 14, wherein the transition member comprises an interior latch and the adapter comprises a tab, and wherein the tab abuts against the plurality of ribs.

17. The fiber optic transition assembly of claim 14, wherein the biasing member is a coil spring.

18. The fiber optic transition assembly of claim 14, further comprising an adhesive disposed within the interior.

* * * * *